United States Patent [19]

Honeycutt

[11] Patent Number: 5,352,368
[45] Date of Patent: Oct. 4, 1994

[54] ALDEHYDE TREATMENT SYSTEM

[75] Inventor: Travis W. Honeycutt, Gainesville, Ga.

[73] Assignee: Isolyser Co., Inc., Norcross, Ga.

[21] Appl. No.: 126,073

[22] Filed: Sep. 23, 1993

[51] Int. Cl.$^5$ .............................................. C02F 1/58
[52] U.S. Cl. ................................. 210/749; 210/908; 588/205
[58] Field of Search ................... 210/727–729, 210/749, 751, 908, 909; 588/205

[56] References Cited

U.S. PATENT DOCUMENTS

| | | | |
|---|---|---|---|
| 3,869,387 | 3/1975 | Vargiu et al. | 210/909 |
| 4,064,220 | 12/1977 | Alon | 210/729 |
| 4,216,088 | 8/1980 | Juferov et al. | 210/909 |
| 4,340,490 | 7/1982 | Junkermann et al. | 210/909 |
| 5,051,184 | 9/1991 | Taylor | 210/909 |

*Primary Examiner*—Thomas Wyse
*Attorney, Agent, or Firm*—Malcolm B. Wittenberg

[57] ABSTRACT

A method of converting a toxic composition containing an aldehyde to a composition which is substantially non-toxic. The aldehyde is reacted with a polymer having protic oxygen or nitrogen atoms, a polyimine or polyimine derivative, and an active aromatic to couple or react with the aldehyde-containing composition. Preferably, this aldehyde conversion process will yield a substantially fluid reaction product by way of a substantially irreversible reaction.

6 Claims, No Drawings

ALDEHYDE TREATMENT SYSTEM

TECHNICAL FIELD OF INVENTION

The present invention deals with a method of converting a toxic composition containing an aldehyde, such as formaldehyde or glutaraldehyde, to a composition which is substantially non-toxic. The reaction yields a substantially fluid reaction product by way of a substantially irreversible reaction.

BACKGROUND OF THE INVENTION

Aldehydes, particularly formaldehyde and glutaraldehyde, are classical disinfectants, sterilizing and preserving agents used since the 18th Century. Formaldehyde is used by health care institutions for preserving tissue and by industry for various manufacturing processes including paper processing and textile treatments. Formaldehyde is also used in the funeral home business for embalming and for disinfecting the surrounding work areas. Formaldehyde, also referred to as "formalin", is sold to these institutions both in a concentrated form (37 to 50% formaldehyde, 6 to 15% alcohol stabilizer, and water) and in dilution, the most common concentration being 3.75% formaldehyde or 10% formalin.

Glutaraldehydes are used by hospitals and laboratories as cold sterilant solutions. The major difference between glutaraldehyde and formaldehyde is that each molecule of glutaraldehyde has five carbons and two reactive carbonyl groups, while formaldehyde has only one carbon and one carbonyl group and is of a lower molecular weight. "Formalin" most likely exists as the "hemiacetal" in alcoholic water solutions in equilibrium.

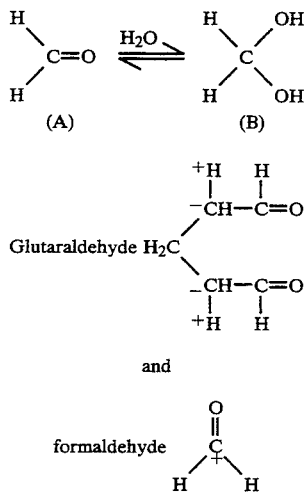

are the only chemicals approved by the EPA as a cold sterilant for sterilizing surgical instruments, endoscopic equipment, arthroscopic instruments, cameras, and similar medical apparatus. Glutaraldehyde is also used to sterilize other surgical instruments and supplies that may be damaged by other sterilizing methods such as steam autoclaving and ethylene oxide (ETO).

The use of aldehydes for medical and industrial applications is extensive. There are millions of gallons of waste water disposed of each year that are contaminated by "aldehyde" solutions. Many aldehydes are classified as acutely-toxic by the EPA. Their use and disposal are regulated by the Food and Drug Administration (FDA), the Occupational Safety and Health Agency (OSHA), the Environmental Protection Agency (EPA), and other state, county and city health and environmental resource departments and Publicly Owned Treatment Works (POTWs). Aldehydes are a particularly insidious danger to the POTWs because they are not detected at levels that are toxic to $E.\ coli$ in the sludge and cause "pass through" after killing the sludge at 0.2 to 1.0 ppm concentrations.

Aldehydes are particularly useful in pathological, biological, microbiological and dissecting laboratories because of their quick, effective kill of all pathogenic organisms. However, aldehydes, with their carbonyl groups, are carcinogenic to mammals. Increasing concern for worker exposure and the environment have initiated the development of new handling, storage, and disposal regulations to limit worker and public exposure. The OSHA defined exposure limit for formaldehyde is 0.75 ppm for an eight-hour exposure period; beyond this level a respirator must be used. Even at this low level of concentration, formaldehyde may not be generally detectable to the sense of smell. If the aldehyde can be smelled, the concentration probably exceeds OSHA Exposure Limits and safety standards.

The risks associated with handling aldehydes begins for the user with the storage of the concentrate after arrival at the purchaser's facility. It continues when the concentrate is diluted for use in the laboratory, operating room, emergency room, morgue and other areas; and finally, when the contaminated "waste water" is collected at the point-of-use. Health risks for workers continue as the used material, typically 10% formalin (3.75% formaldehyde), is transported to designated storage areas or poured down the drain into waste water treatment systems. Disposal of aldehydes is regulated by the local publicly owned waste water treatment system (POTW).

All pollutants and pesticides are considered to be a threat to microbes that are needed to break down waste materials in the Waste water treatment process. New regulations are designed to prevent the waste generator from disposing of toxic materials into the POTW. The local POTW has the authority to monitor waste water at the generation site. Hospitals, laboratories, funeral homes and industry are now held to a much higher standard of control and compliance than they were a few years ago. The liability exposure is considerable to violators, both to their reputation in the community and to the possibility of substantial fines for each violation.

The highest levels of formalin sold for cold sterilization and for preserving tissue range from 37 to 50% active formaldehyde. Concentrations in this range must be disposed by a licensed hazardous waste disposal facility. In essence, formaldehyde at these concentrations must be either incinerated or recycled. Lower concentrations of formaldehyde must be handled in a similar way. Many hazardous and toxic waste contractors pour the contaminated waste water into absorbents, such as vermiculite, to convert this into a "solid", thereby making it possible to burn the material in the more numerous solid hazardous waste incinerators. However, this "pouring" and "handling" increases the facility employees' exposure to these toxic materials.

As concern for worker and environmental exposure increases, various methods, techniques and products have been sought to reduce the risk of exposure to these potentially toxic and carcinogenic aldehydes. However, to date, there has not been a suitable and cost effective method available to remove aldehydes such as formaldehyde and glutaraldehyde from waste streams after their disinfecting properties have been utilized.

It is an object of the present invention to provide a method of removing spent aldehydes from liquids, with the residual material being substantially non-toxic which can then be safely and efficiently disposed in the sewer.

An additional objective of the present invention is to convert a toxic composition containing an aldehyde, such as formaldehyde or glutaraldehyde, to a non-toxic composition by a substantially irreversible reaction.

These and further objects will be more readily appreciated when considering the following disclosure and appended claims.

SUMMARY OF THE INVENTION

The present invention involves a method of converting a toxic composition containing an aldehyde to a composition which is substantially non-toxic with the aldehyde irreversibly modified. The method consists of reacting the aldehyde with a separate reactive aromatic molecule such as resorcinol, capable of undergoing ortho and para electrophilic substitution, and a polymer having protic nitrogen atoms such as a polyimine or polyimine derivative to substantially couple or react and preferably form a fluid reaction product by way of substantially irreversible reaction.

DETAILED DESCRIPTION OF THE INVENTION

The present invention involves a substantial reduction of toxicity of a waste stream containing aldehydes, such as formaldehyde and glutaraldehyde, by irreversibly reacting these aldehydes to produce substantially non-toxic end-products. It is contemplated that the aldehydes will be irreversibly reacted with reactive resorcinol molecules and polymers having protic nitrogen atoms, such as a polyimine or polyimine derivative (BASF POLYMIN TM G-20, G-35 or P), that will not result in a hazardous waste product. At the time of the subject reaction, the liquid will be converted to a polymeric mass that is soluble or dispersible in water. The liquid aldehyde waste is "coupled", chemically modified or preferably "captured" and can be disposed of as a non-toxic liquid Although not wishing to be bound by any particular reaction theory, it is believed that the polyimine acts as a initiator for the resorcinol formaldehyde polymerization. Basic polyimine activates the ortho and para position of resorcinol by reacting with its hydroxyl group. The carbonyl group of formaldehyde reacts with activated resorcinol forming prepolymer with a methylene and oxymethylene bridge:

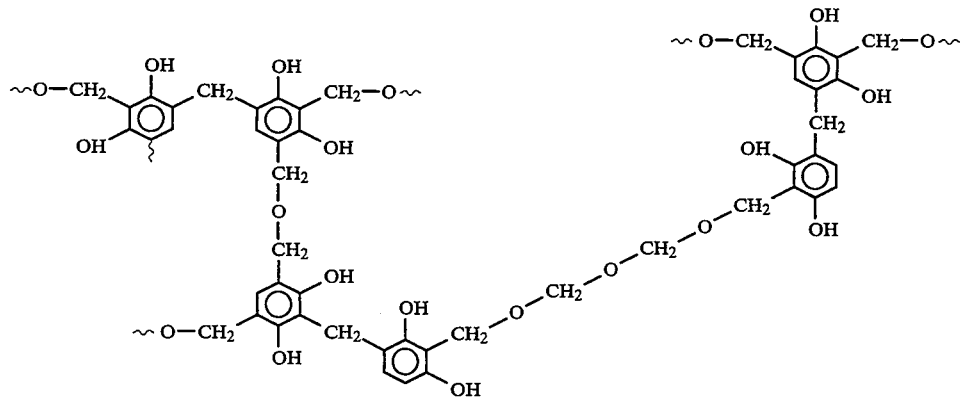

Finally, resorcinol formaldehyde prepolymer would be stabilized by the polyimine through an ionic reaction between the amino group and hydroxyl group of resorcinol. This irreversible reaction effectively removes the aldehydes from the waste stream so that they can no longer be a potential contaminate to the environment. The liquid by-product of this reaction is an appended cross-linked polymer which is not an environmental hazard.

Typically, glutaraldehyde waste streams contain approximately 2% glutaraldehyde or less. Preferably, these waste streams are reacted with 1–1.5 equivalents of a polyimine. The amine polymer may be protonated with acetic acid or formic acid. The reaction product of glutaraldehyde and polyimine is an imine or Schiff base type product:

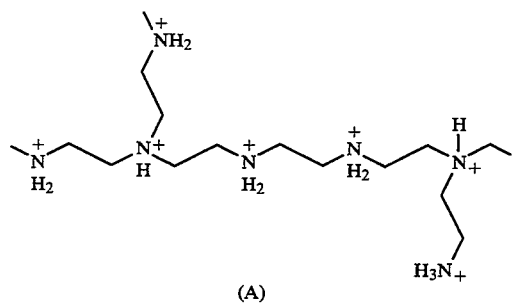

(A)

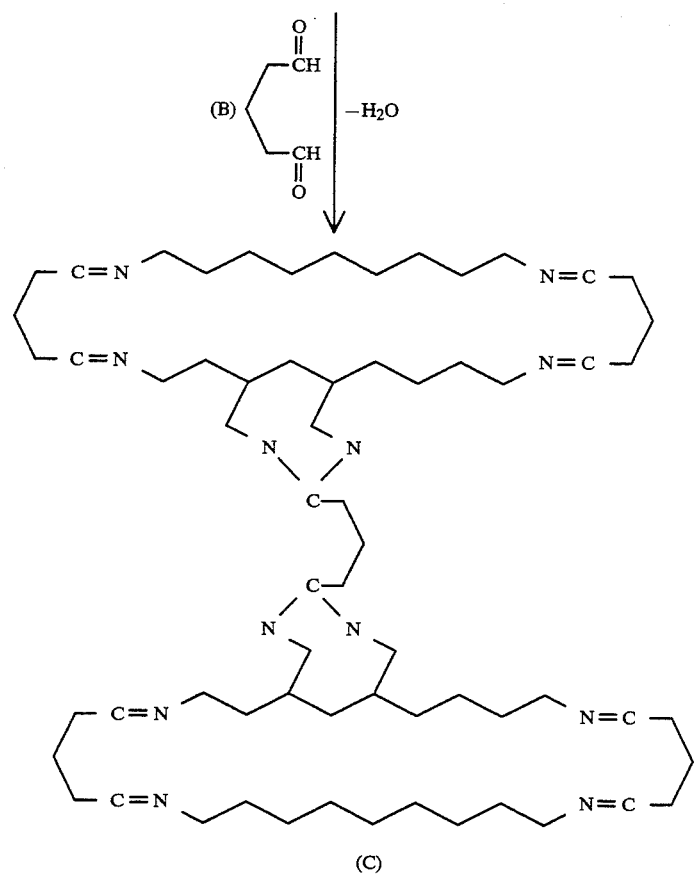

In this reaction, glutaraldehyde molecules react with the amino groups of polyimine to form imine bridges (C=N) and water molecules.

Usually, simple imine (C=N) cross link would not be particularly stable to the hydrolytic condition. However, the added hydrolytic stability of the glutaraldehyde-amino acid cross link is due to a substantially different type of cross link. Due to the reactivity of the two α hydrogens and the perfect length (for this reaction) of a five carbon chain, glutaraldehyde is able to form stable cross links with the amino groups of the polyimine. In some cases, glutaraldehyde reacts with itself through Aldol Condensation, helping to stabilize the cross links. One example of this type of cross-linking pathway, responsible for the high hydrolytic stability, is as follows:

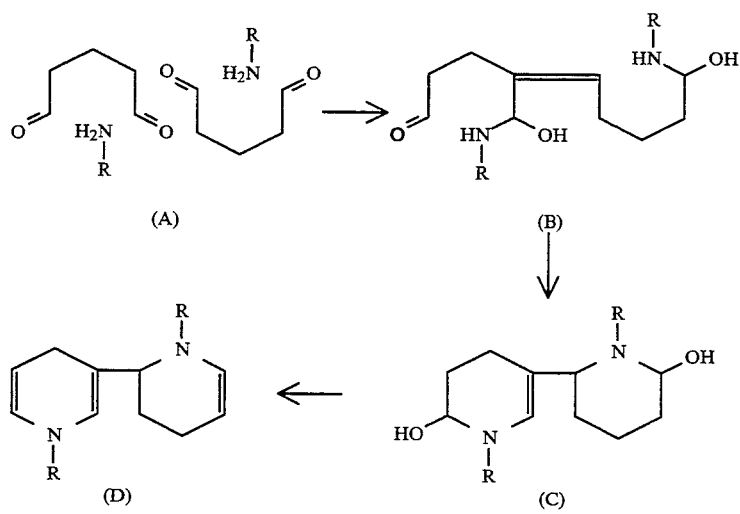

This reaction scheme incorporates both reactions of two carbonyl groups and two α hydrogens. As shown in this pathway, two molecules of glutaraldehyde react with two of the amino groups of the polyimine in a multi-step reaction to yield the framework of a bipyridyl cross link. This cross link is responsible for their high hydrolytic stability.

The polyimine component has protic nitrogen atoms and can be the polymerization product of any alkyl or aryl amine and preferably a complex mixture of primary, secondary and tertiary amines.

By employing a primary amine and formaldehyde as the principal reactants with resorcinol, it is believed that the reaction which takes place is as follows:

HCHO + resorcinol + polyimine ⟶

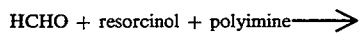
water soluble polyimine stabilized resorcinol formaldehyde prepolymer

Glutaraldehyde + polyimine ⟶

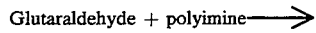
water soluble polymer with imine, aminale and pyridyl crosslinking.

EXAMPLE I 1 g of the polyimine (POLYMIN ™ G-35,BASF) and 0.5 g of resorcinol were mixed in water solution (98.5 g). To sixty grams of 10% formalin (3.75% formaldehyde) was stirred into 4 g of the above mixture solution. A formaldehyde residue test using MBTH method (reporting limit 1 mg/1) demonstrated that no formaldehyde residue was detected. More than 99.75% removal of the formaldehyde had taken place. What remained was well below acceptable toxic levels.

EXAMPLE II 1 g of the polyimine (POLYMIN ™ G-35, BASF), 0.5 g of resorcinol and 0.2 g NaOH were mixed in water solution (98.5 g). To sixty grams of 10% formalin (3.75% formaldehyde) was stirred into 4 g of the above mixture solution. A formaldehyde residue test using MBTH method (reporting limit 1 mg/1) demonstrated that no formaldehyde residue was detected. More than 99.75% removal of the formaldehyde had taken place. What remained was well below acceptable toxic levels.

EXAMPLE III 1 g of the polyimine (POLYMIN ™ G-35, BASF), 0.5 g of resorcinol and 0.3 g p-toluenesulfonic acid (PTSA) were mixed in water solution (98.5 g). To sixty grams of 10% formalin (3.75% formaldehyde) was stirred into 4 g of the above mixture solution. A formaldehyde residue test using MBTH method (reporting limit mg/1) demonstrated that formaldehyde residue was not detected. More than 99.75% removal of the formaldehyde had taken place. What remained was well below acceptable toxic levels.

We claim:

1. A method of converting a toxic composition containing aldehyde to a composition which is substantially non-toxic, said method comprising reacting said aldehyde with resorcinol capable of undergoing ortho and para electrophilic substitution and a polyimine forming a liquid product by way of a substantially irreversible reaction.

2. The method of claim 1 wherein said aldehyde is a member selected from the group consisting of formaldehyde and glutaraldehyde.

3. A method of disposal of a toxic composition containing an aldehyde into a waste water treatment system, said method comprising reacting said aldehyde with resorcinol capable of undergoing ortho and para electrophilic substitution and a polyimine forming a liquid product by way of a substantially irreversible reaction whereby said liquid product is introduced to said waste water treatment system.

4. The method of claim 3 wherein said aldehyde is a member selected from the group consisting of formaldehyde and glutaraldehyde.

5. The method of claim 3 wherein said reaction is substantially irreversible.

6. The method of claim 3 wherein said liquid product is substantially non-toxic.

* * * * *